US008228830B2

(12) United States Patent
Babin et al.

(10) Patent No.: US 8,228,830 B2
(45) Date of Patent: Jul. 24, 2012

(54) USING A TRANSMISSION CONTROL PROTOCOL (TCP) CHANNEL TO SAVE POWER FOR VIRTUAL PRIVATE NETWORKS (VPNS) THAT USE USER DATAGRAM PROTOCOL (UDP)

(75) Inventors: Stephen W. Babin, Cedar Park, TX (US); John D. Kari, Coeur d'Alene, ID (US); Michael L. Masterson, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 1074 days.

(21) Appl. No.: 11/969,250

(22) Filed: Jan. 4, 2008

(65) Prior Publication Data

US 2009/0175282 A1    Jul. 9, 2009

(51) Int. Cl.
*G08C 17/00* (2006.01)
(52) U.S. Cl. .................. 370/311; 370/328; 370/400
(58) Field of Classification Search .................. 370/230, 370/230.1, 235, 311, 328–329, 331–332, 370/341, 433, 437, 465–466, 400–401
See application file for complete search history.

(56) References Cited

U.S. PATENT DOCUMENTS

| | | | |
|---|---|---|---|
| 4,903,319 A | | 2/1990 | Kasai et al. |
| 5,404,355 A * | | 4/1995 | Raith .............................. 370/311 |
| 6,445,932 B1 | | 9/2002 | Soini et al. |
| 7,177,646 B2 * | | 2/2007 | O'Neill et al. ................. 455/450 |
| 7,289,480 B2 * | | 10/2007 | Lundstrom et al. ............ 370/338 |
| 7,346,684 B2 * | | 3/2008 | Borella .......................... 709/225 |
| 7,558,604 B2 * | | 7/2009 | Narayanaswami et al. ... 455/574 |
| 7,634,270 B2 * | 12/2009 | Gallagher et al. ............. 455/436 |
| 7,672,264 B2 * | 3/2010 | Babin ............................ 370/318 |
| 7,760,670 B2 * | 7/2010 | Causier ......................... 370/276 |
| 7,796,589 B2 * | 9/2010 | Cohen et al. ................... 370/389 |
| 7,961,659 B2 * | 6/2011 | Zaks .............................. 370/311 |
| 7,962,159 B2 * | 6/2011 | Beard et al. ................... 455/466 |
| 8,073,471 B1 * | 12/2011 | Spencer ........................ 455/458 |
| 2004/0029621 A1 | 2/2004 | Karaoguz et al. |
| 2004/0224716 A1 | 11/2004 | Choi |
| 2005/0025182 A1 * | 2/2005 | Nazari ........................... 370/469 |
| 2005/0245292 A1 | 11/2005 | Bennett et al. |
| 2006/0068751 A1 | 3/2006 | Chandra et al. |
| 2007/0140159 A1 * | 6/2007 | Eronen et al. ................. 370/328 |
| 2007/0298848 A1 * | 12/2007 | Babin ............................ 455/574 |
| 2008/0095092 A1 * | 4/2008 | Kim .............................. 370/311 |
| 2010/0157867 A1 * | 6/2010 | Babin ............................ 370/311 |

FOREIGN PATENT DOCUMENTS

| | | |
|---|---|---|
| EP | 0709763 B1 | 8/2003 |
| WO | WO018264 A1 | 11/2001 |

* cited by examiner

*Primary Examiner* — Chi H. Pham
*Assistant Examiner* — Kevin Mew
(74) *Attorney, Agent, or Firm* — Matthew B. Talpis; Gregory K Goshorn; Greg Goshorn, P.C.

(57) ABSTRACT

Provided is a method for maintaining a Virtual Private Network (VPN) connection between a mobile device and a server over a wireless network in a manner that conserves the power supply of the mobile device and is suitable for connections that employ server-initiated traffic. After a successful login to a VPN server, a VPN client establishes a Transport Control Protocol (TCP) connection and a UDP connection with the server. After a power timeout, the server calculates the elapsed time between the current transmission and the last tunnel traffic. If the elapsed time exceeds a power timeout value, the VPN server transmits a simple control message to the client via the TCP channel. The client then reestablishes the UDP connection to the client and the server resumes transmission on the reestablished UDP channel.

17 Claims, 6 Drawing Sheets

USING A TRANSMISSION CONTROL PROTOCOL (TCP) CHANNEL TO SAVE POWER FOR VIRTUAL PRIVATE NETWORKS (VPNS) THAT USE USER DATAGRAM PROTOCOL (UDP)

BACKGROUND

1. Technical Field

The present invention relates generally to power conservation in a mobile computing device and, more specifically, to a method of employing a TCP channel to maintain a UDP connection during periods of inactivity on handheld communication devices.

2. Description of the Related Art

A virtual private network (VPN), such as Websphere Everyplace Connection Manager (WECM) published by International Business Machines Corp. (IBM) of Armonk, N.Y., enables a client device to connect from outside of a firewall to a corporate network protected by the firewall. Using a VPN, a client device or application can communicate with server processes on the corporate network over a secure channel, or "tunnel." When logging into a server through a VPN connection, the client typically must negotiate a new VPN session with the server and enter credentials, which may entail entering a secure identification (ID) code. This "upfront" overhead can be time consuming. To avoid the overhead associated with establishing a VPN connection, a client typically logs into the server through the VPN and remains logged in for extended periods of time.

Many current communication devices are wireless and depend upon battery power to operate. Three (3) areas in which battery-powered devices employing a VPN expend energy are as follows: 1) transferring data through the device's network hardware; 2) maintaining a connection by transmitting regular "keep-alive" packets to refresh a network address translation (NAT) server; and 3) scanning for and connecting to faster, higher priority network connections.

A Network Address Translation (NAT) is often employed to enable a group of machines with local area network (LAN) access to share a single or small group of external Internet Protocol (IP) addresses. The NAT maintains a table to keep track of connection mappings, which are identified via port addresses. An incoming packet from an external network must have an open mapping entry to ensure a message is delivered to a destination, or client, machine serviced by the NAT. A NAT serves three main purposes: 1) providing a type of firewall by hiding internal IP addresses; 2) enabling a company to use more internal IP addresses since they're used internally only; and 3) allowing a company to combine multiple communication connections into a single Internet connection.

To maximize efficiency, VPN software typically encapsulates transformed network traffic into User Datagram Protocol (UDP) packets for sending over a network. One issue with UDP over a NAT is that frequent "keep-alive" packets must be transmitted to maintain the UDP connection. NAT mapping entries are only created from the client side and are typically discarded if not used for a pre-configured period of time. This timeout is implemented to prevent further, and perhaps unauthorized, traffic from coming in on the particular mapping. Since a NAT timeout prevents a client from receiving further packets from a server, keep-alive packets are sent at regular intervals, with each interval shorter than the NAT mapping timeout value. This prevents the situation in which the client sends a request, the server takes longer than the timeout value to respond and the NAT therefore discards the server's response.

UDP NAT timeouts are often in the range of thirty (30) second to one (1) minute, as opposed to TCP connections that may remain open up to twenty-four (24) hours. Further, a connection may only need to remain active during specific, client-initiated operations, such as, but not limited to, synching an email program or browsing a web page. In these situations, a premature NAT timeout can cause a program hang or a synchronization event to failure.

As explained above, during periods of inactivity, a connection through a NAT is typically maintained by transmitting keep-alive packets. Otherwise, information returned from a server may be lost due to a NAT timeout. Although the power necessary to transmit keep-alive packets is not an issue for personal computers (PCs) or laptops that are connected to a sustainable power source, extra packet transmission is an issue for devices powered by batteries. Devices such as pocket PCs and cellular telephones have a limited battery charge and any unnecessary power usage limits the amount of time the devices can be used in between charges.

One approach to address this issue is described in U.S. patent application Ser. No. 11/425,412, entitled "Method of Pausing Keep-Alive Messages and Roaming for Virtual Private Networks on Handheld Devices to Save Battery Power" (the "'412 application"), filed Jun. 21, 2006. However, the technology disclosed in the '412 application is primarily directed to data traffic initiated from the client side. In other words, the '412 application does not address the situation in which a server initiates traffic, such as with "push" email and Voice Over Internet protocol (VoIP) telephone calls.

What is needed is a power conservation technique for mobile devices that minimizes the need for keep-alive messages in situations in which server-initiated traffic is employed. In addition, such a method should preferably also reduce the overhead associated with establishing and maintaining a VPN connection and the processing and associated power usage of roaming when the device is not in use.

SUMMARY OF THE CLAIMED SUBJECT MATTER

Provided is a method for maintaining a Virtual Private Network (VPN) connection between a mobile device and a server over a wireless network in a manner that conserves the power supply of the mobile device and is suitable for connections that employ server-initiated traffic. The disclosed techniques address the issue of conserving the power of a mobile device during periods when the VPN connection is inactive.

After a successful login to a VPN server, a VPN client establishes a Transport Control Protocol (TCP) connection with the server. For data transport, the VPN channel employs a UDP protocol. A configurable parameter, or power timeout, specifies an idle time. When a period of time equal to the parameter has passed with no traffic between the mobile device and the VPN server, in either direction, some routine channel maintenance activity, such as periodic roaming scans and keep-alive messages, is halted. For example, if the power timeout is set to a value of twenty (20) minutes, and an email through the VPN tunnel is initiated, the connection is maintained throughout the synchronization. Twenty minutes after the synchronization has completed, if there is no further traffic, the keep-alive packets and the roaming cease, thus conserving power. When the user performs another synchronization, or initiates any other traffic, the mobile device establishes a channel and resumes transmission of keep-alive packets.

After a power timeout implanted in accordance with the claimed subject matter, the original VPN connection is still valid so there is no overhead associated with establishing a VPN connection. However, typically a corresponding NAT entry is not valid. When the client reinitiates the connection, a new NAT entry is created, with the client possibly communicating via a different IP address. In that case, a short exchange between the VPN server and the client to register the changed IP address is executed, an exchange that is both fast and transparent to the user.

If the server reinitiates the connection, the server calculates the elapsed time between the current transmission and the last tunnel traffic. If the elapsed time exceeds the power timeout, the VPN server transmits a simple control message to the client via the TCP channel. The client then reestablishes the UDP connection as described above and the server sends data to the client on the reestablished UDP channel and the power timer is reset. Once the UDP channel has been reestablished, the client may resume transmission.

In the alternative, the TCP channel is utilized to send the data to the client and the control signal is either implicit in the data transmission or the control signal includes an indication whether or not more data may be expected, thus requiring the reestablishment of the UDP channel. In the event the server has signaled the client that the UDP should be reestablish, the client resumes the transmission of keep-alive messages and addition traffic is routed through the UDP channel. The TCP channel may also function as a backup channel to the UDP connection.

This summary is not intended as a comprehensive description of the claimed subject matter but, rather, is intended to provide a brief overview of some of the functionality associated therewith. Other systems, methods, functionality, features and advantages of the invention will be or will become apparent to one with skill in the art upon examination of the following figures and detailed description.

BRIEF DESCRIPTION OF THE FIGURES

A better understanding of the present invention can be obtained when the following detailed description of the disclosed embodiments is considered in conjunction with the following figures.

DETAILED DESCRIPTION OF THE FIGURES

Although described with particular reference to a mobile telephone, the claimed subject matter can be implemented in any communication system in which power conservation is desirable. Those with skill in the computing arts will recognize that the disclosed embodiments have relevance to a wide variety of computing environments in addition to those described below. In addition, the methods of the disclosed invention can be implemented in software, hardware, or a combination of software and hardware. The hardware portion can be implemented using specialized logic; the software portion can be stored in a memory and executed by a suitable instruction execution system such as a microprocessor, personal computer (PC) or mainframe.

In the context of this document, a "memory" or "recording medium" can be any means that contains, stores, communicates, propagates, or transports the program and/or data for use by or in conjunction with an instruction execution system, apparatus or device. Memory and recording medium can be, but are not limited to, an electronic, magnetic, optical, electromagnetic, infrared or semiconductor system, apparatus or device. Memory an recording medium also includes, but is not limited to, for example the following: a portable computer diskette, a random access memory (RAM), a read-only memory (ROM), an erasable programmable read-only memory (EPROM or flash memory), and a portable compact disk read-only memory or another suitable medium upon which a program and/or data may be stored.

One embodiment, in accordance with the claimed subject, is directed to a programmed method for conserving power in mobile communication devices. The term "programmed method", as used herein, is defined to mean one or more process steps that are presently performed; or, alternatively, one or more process steps that are enabled to be performed at a future point in time. The term programmed method anticipates three alternative forms. First, a programmed method comprises presently performed process steps. Second, a programmed method comprises a computer-readable medium embodying computer instructions, which when executed by a computer performs one or more process steps. Finally, a programmed method comprises a computer system that has been programmed by software, hardware, firmware, or any combination thereof, to perform one or more process steps. It is to be understood that the term "programmed method" is not to be construed as simultaneously having more than one alternative form, but rather is to be construed in the truest sense of an alternative form wherein, at any given point in time, only one of the plurality of alternative forms is present.

Figure 1:
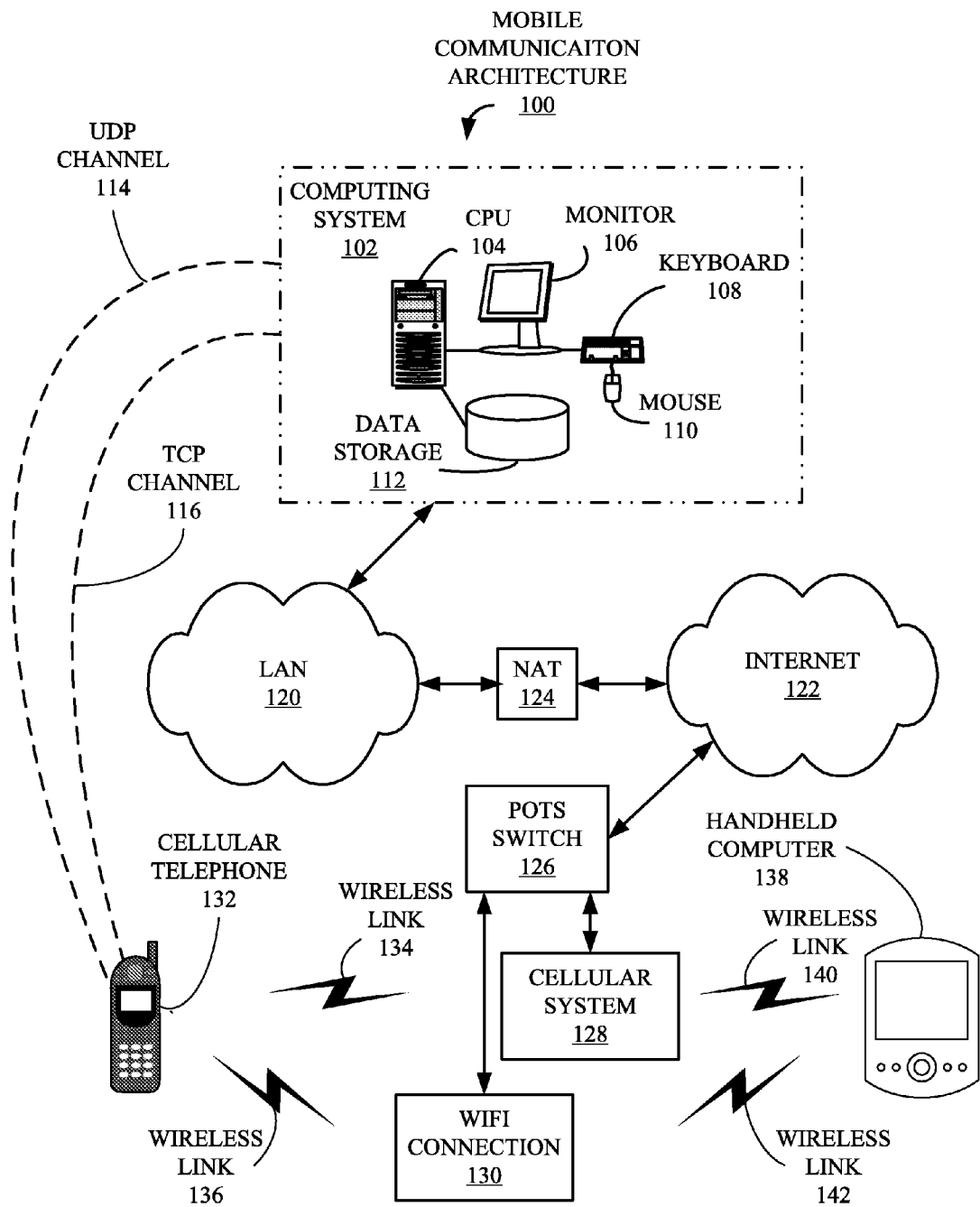
FIG. 1 is a block diagram of an exemplary mobile communication architecture that incorporates the claimed subject matter.

Turning now to the figures, FIG. 1 is an example of a mobile communication architecture 100, implemented according to the claimed subject matter. It should be noted that architecture 100 is only one example of a configuration in which the claimed subject matter may be implemented. Those with skill in the computing and communication arts should appreciate that there are many types of devices and communication and computing environment that may be incorporated into such a system.

Architecture 100 includes a computing system 102. Computing system 102 includes a central processing unit (CPU) 104, coupled to a monitor 106, a keyboard 108 and a mouse 110, which together facilitate human interaction with computer 102. Also included in computer 102 and attached to CPU 104 is a data storage component 112, which may either be incorporated into CPU 104 i.e. an internal device, or attached externally to CPU 104 by means of various, commonly available connection devices such as but not limited to, a universal serial bus (USB) port (not shown).

Computing system 102 is communicatively coupled to a local area network (LAN) 120. LAN 120 is coupled to the Internet 122 via a network address translation device (NAT)

124. As explained above in the Background, NAT 124 is employed to enable a group of devices with access to LAN 120 access to share a single or small group of external IP addresses, corresponding to Internet 122. Also connected to Internet 122 is a plain old telephone switch (POTS) 126. A cellular system 128 and a WiFi connection 130 are coupled to POTS 126 and, via POTS 126, to Internet 122. In this example, two mobile communication/computing devices, i.e. a cellular telephone 132 and a handheld computer 138, are both able to communicate with cellular system 128 and WiFi connection 130.

Wireless link 134 represents a communication link between cellular telephone 132 and cellular system 128. Wireless link 136 represents a communication link between cellular telephone 132 and WiFi connection 130. Typically, only one of links 134 and 136 is active. Cellular telephone 132 "roams" between links 134 and 136, as well as other possible communication links, which for the sake of simplicity are not shown. Cellular telephone 132 selects which of links 134 or 136 to utilize based upon preconfigured parameters. For example, telephone 132 may select the link 134 or 136 based either upon the strength of the connection or the relative costs of the connections 134 and 136. Power Conservation Logic (PCL) 150 (see FIG. 2) determines whether or not telephone 132 continues to roam following a predetermined period of inactivity. The function of PCL 150 is explained in more detail below in conjunction with FIGS. 2-6.

Wireless link 140 represents a communication link between handheld computer 138 and cellular system 128. Wireless link 142 represents a communication link between handheld computer 138 and cellular system 130. Typically, only one of links 140 and 142 is active. Like telephone 132, handheld computer 138 "roams" between links 140 and 142, as well as other possible communication links, which for the sake of simplicity are not shown, and selects which of links 140 or 142 to utilize based upon preconfigured parameters. Handheld computer 138 also incorporates logic like PCL 150 to determine whether or not computer 138 continues to roam following a predetermined period of inactivity.

FIG. 1 also illustrates two possible communication links between computing system 102 and cellular telephone 132, i.e. a UDP channel 114 and a TCP channel 116. Channels 114 and 116 are illustrated as dashed lines because they merely abstractly represent communication channels implementing the respective protocols that are carried via LAN 120, LAN 122, NAT 124, POTS switch 126, cellular system 128, WiFi connection 130 and wireless links 134, 136, 140 and 142 as appropriate. TCP channel 116 is maintained in an active state by means of a periodic "ping" from telephone 132 during periods of inactivity that equal a timeout value associated with TCP channel 116. Those with skill in the computing and communication arts should recognize UDP and TCP channels 114 and 116 and appreciate ways in which channel 114 and 116 would be implemented via the available communication resources and channels.

Figure 2:
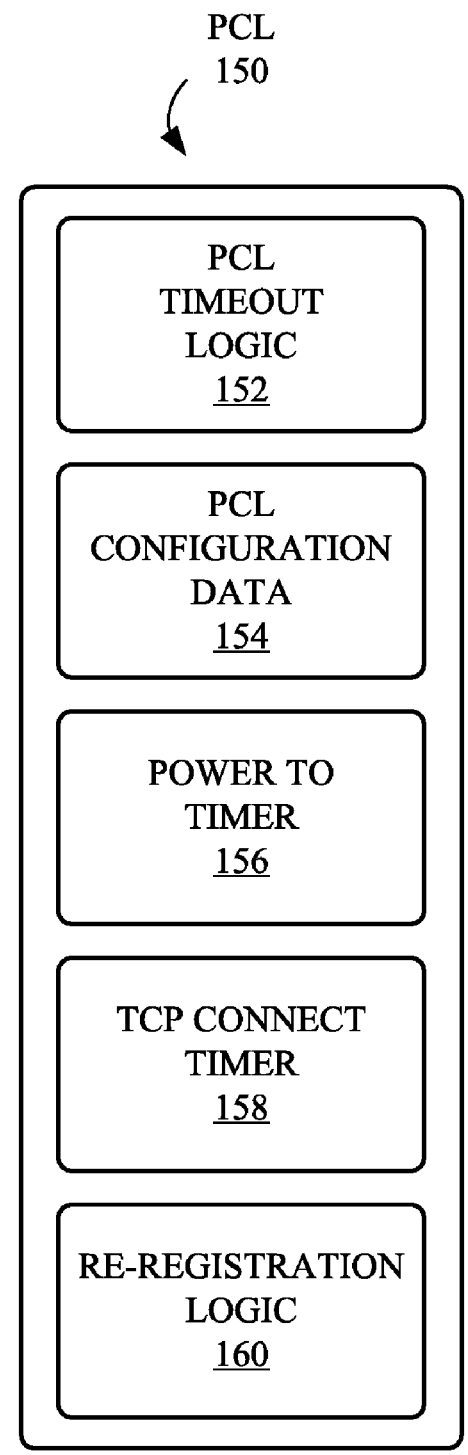
FIG. 2 is a block diagram of a power conservation module (PCM) that implements the claimed subject matter.

FIG. 2 is a block diagram of power conservation logic (PCL) 150 that implements the claimed subject matter. In the following description, PCL 150 is incorporated into the logic of cellular telephone 132 (FIG. 1). It should be noted that telephone 132 is used for illustrative purposes only and that are many types of communication devices, such as but not limited to handheld computer 138 (FIG. 1), that may take advantage of the claimed technology.

PCL 150 includes a PCL timeout logic module 152 that controls the implementation of the claimed subject matter. In other words, module 152 executes code to halt the transmission of keep-alive messages from, in this example, cellular telephone 132. In addition, module 152 halts the roaming functionality of cellular telephone 132.

A PCL configuration data module 154 stores information, or parameters, associated with a particular implementation of the claimed subject matter. One example of a parameter stored in conjunction with data 154 is a power timeout. A power timeout specifies an interval of time that is required to pass without activity on telephone 132 before logic 152 suspends roaming activity and the transmission of keep-alive messages. The power timeout parameter mat be set, or configured, by a user of telephone 132. A second parameter, or power state, stored in conjunction with data 154 is an indication of whether or not telephone 132 is currently in the power conservation state, i.e. operating with suspended keep-alive messages and roaming. A third parameter, or TCP Connect Time, specifies how often telephone 132 needs to ping computing system 102 so that TCP channel 116 (FIG. 1) is not deactivated because of lack of use.

A power timeout (TO) timer 156 keeps track of the interval of time between the current time and the last time that the VPN of the subject device, or telephone 132, has been active. If this calculated interval of time is longer or equal to the power timeout value stored in data 154, a signal is transmitted to logic 152 to discontinue routine channel maintenance activities to conserve power. The use of timer 156 is explained in more detail below in conjunction with FIGS. 4-6.

A TCP Connect timer 158 keeps track of the interval of time between the current time and the last time that TCP channel 116 has been active. If this calculated interval of time is longer or equal to the TCP channel timeout value stored in data 154, a signal is transmitted to computing system 102 via TCP channel 116 so that TCP channel remains active and is not terminated.

A re-registration module 160 executes if telephone 132 has discontinued maintenance activity as indicated by one of the exemplary, power state parameter stored in data 154 and described above. If power state parameter indicates telephone 132 has discontinued maintenance activity and other activity is detected, then re-registration logic executes to reestablish the registration of telephone 132 with NAT 124 (FIG. 1). In addition, module 160 reregisters cellular telephone 132 with NAT 124 in the event a signal is received via a TCP channel 116 (FIG. 1). The re-registration process is described in more detail below in conjunction with FIG. 3.

Figure 3:
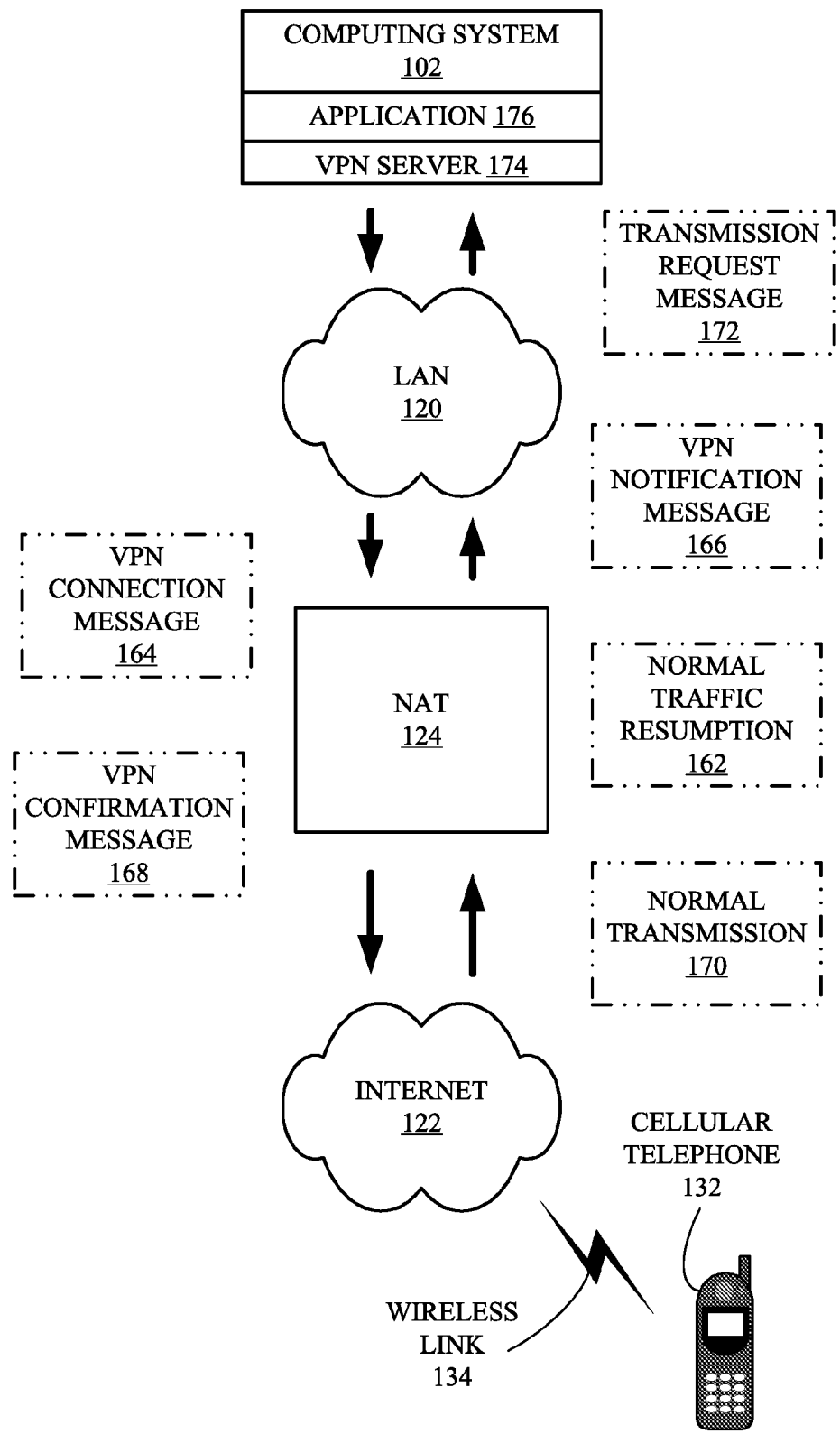
FIG. 3 is a block diagram illustrating exemplary data traffic between the cellular telephone and computing system via the NAT, each introduced in FIG. 1.

FIG. 3 is a block diagram illustrating exemplary data traffic between cellular telephone 132 and computing system 102 via NAT 124, each of which were introduced above in conjunction with FIG. 1. Also illustrated are LAN 120 (FIG. 1) and Internet 122 (FIG. 1).

In this example, telephone 132 is communicating to computing system 102 via LAN 120, Internet 122, NAT 124 and wireless connection 134 (FIG. 1), although communication may be wireless connection 126 (FIG. 1) or may be another wireless connection. In this figure, computing system 102 includes a virtual private network (VPN) server 174 and an application 176. Communications between telephone 132 and application 176 on computing system 102 via LAN 120, Internet 122, NAT 124 and wireless connection 134 are carried on a VPN tunnel established and maintained by VPN server 174. In this example, both application 176 and VPN server 174 are stored in data storage 112 (FIG. 1) and executed on CPU 104 (FIG. 1). VPN server 174 provides secure communication channels for applications or devices that are remote from computing system 102 and/or LAN 120. The setup and establishment of a secure VPN connection should be understood to those with skill in the computing and communication arts.

This figure illustrates the communication among VPN server 174, LAN 122, NAT 124 and telephone 132 after a period of time greater than the power timeout parameter described above in conjunction with FIG. 2 both with respect to a server-initiated resumption of communication and a client-initiated resumption. In other words, FIG. 3 illustrates the resumption of communication, either by the server or the client, after a period of inactivity between application 176 and telephone 132. The communication is via the VPN tunnel established and maintained by VPN server 174. The period of inactivity is greater than or equal to a period of time specified in PCL configuration data 154 (FIG. 2), such that PCL timeout logic 152 (FIG. 2) has configured telephone 132 into a power conservation mode according to the claimed subject matter. The monitoring of telephone 132 with respect to the power timeout is described in detail below in conjunction with FIG. 6.

Some messages described below are generated by re-registration logic 160 (FIG. 2) of telephone 132. A server-initiated resumption of communication between computing system 102 and cellular telephone 132 begins with a Transmission Request Message 172 from VPN server 174 to cellular telephone 132 via TCP channel 116 (FIG. 1). Message 172 is transmitted form VPN server 174 when the VPN server 174 determines that a period of communication inactivity has exceeded the power timeout parameter. Message 172 serves to inform cellular telephone 132 that an application such as application 176 has data to transmit. As described above, two examples of types of data that may be initiated by an application include, but are not limited to, push email and an incoming VoIP telephone call (from the perspective of telephone 132). In the alternative, message 172 may also include all or a portion of the data that application 176 is transmitting. If message 172 includes the entire intended message, a flag (not shown) may be set in message 172 so that PCL logic 150 does not execute the additional steps described below to reestablish the UDP connection through NAT 124.

Following receipt of message 172 or in the event cellular telephone 132 wants to initiated communication from the client side, the first message transmitted via the dormant UDP connection is a Normal Traffic Resumption message 162, which notifies NAT 124 that telephone 132 is resuming transmission. In other words, the following messages are transmitted via UDP channel 114 (FIG. 1) when UDP traffic between telephone 132 and application 176 resumes after telephone 132 has entered a power conservation mode. Message 162 is simply the first packet transmitted by telephone 132 following a timeout rather than any special type of message. As explained above, a NAT 124 entry corresponding to telephone 132 is discarded after a period of time without activity that is shorter then a NAT entry timeout value. The power timeout value stored in PCL configuration data 154 is longer than the NAT entry timeout. It should be noted that even though the NAT 124 entry corresponding to telephone 132 has been deleted the VPN connection maintained by VPN server 174 is still active because, typically, VPN connections have much longer timeout parameters than NAT entries.

Once NAT 124 detects message 162, NAT 124 creates a table entry that correlates the IP address associated with telephone 132 with an internal IP address for telephone 132. Message 162 is then forwarded to VPN server 174, which detects that the internal IP address associated with message 162 does not correspond to a recognized VPN connection.

At this point, VPN server 174 initiates an exchange with telephone 132 to correlate a particular VPN connection with the current traffic. A VPN connection message 164 is transmitted from VPN server 174 to telephone 132; a VPN notification message 166 is transmitted from telephone 132 to VPN server 174 with information relating to the existing VPN connection; and a VPN confirmation message 168 is transmitted from VPN server 172 to telephone 132 to notify telephone 132 that the VPN connection via a UDP connection is reestablished. Messages 164, 166 and 168 enable VPN server 174 and telephone 132 to update information that correlates a particular connection to a particular VPN connection, in this case the connection between telephone 132 and application 176.

Following messages 162, 164, 166 and 168, telephone 132 resumes normal transmission 170 via UDP channel 114. In addition to resuming normal transmission 170, telephone 132 resumes roaming, i.e. searching for a more optimum communication channel and switching communication to such a channel is detected.

Figure 4:
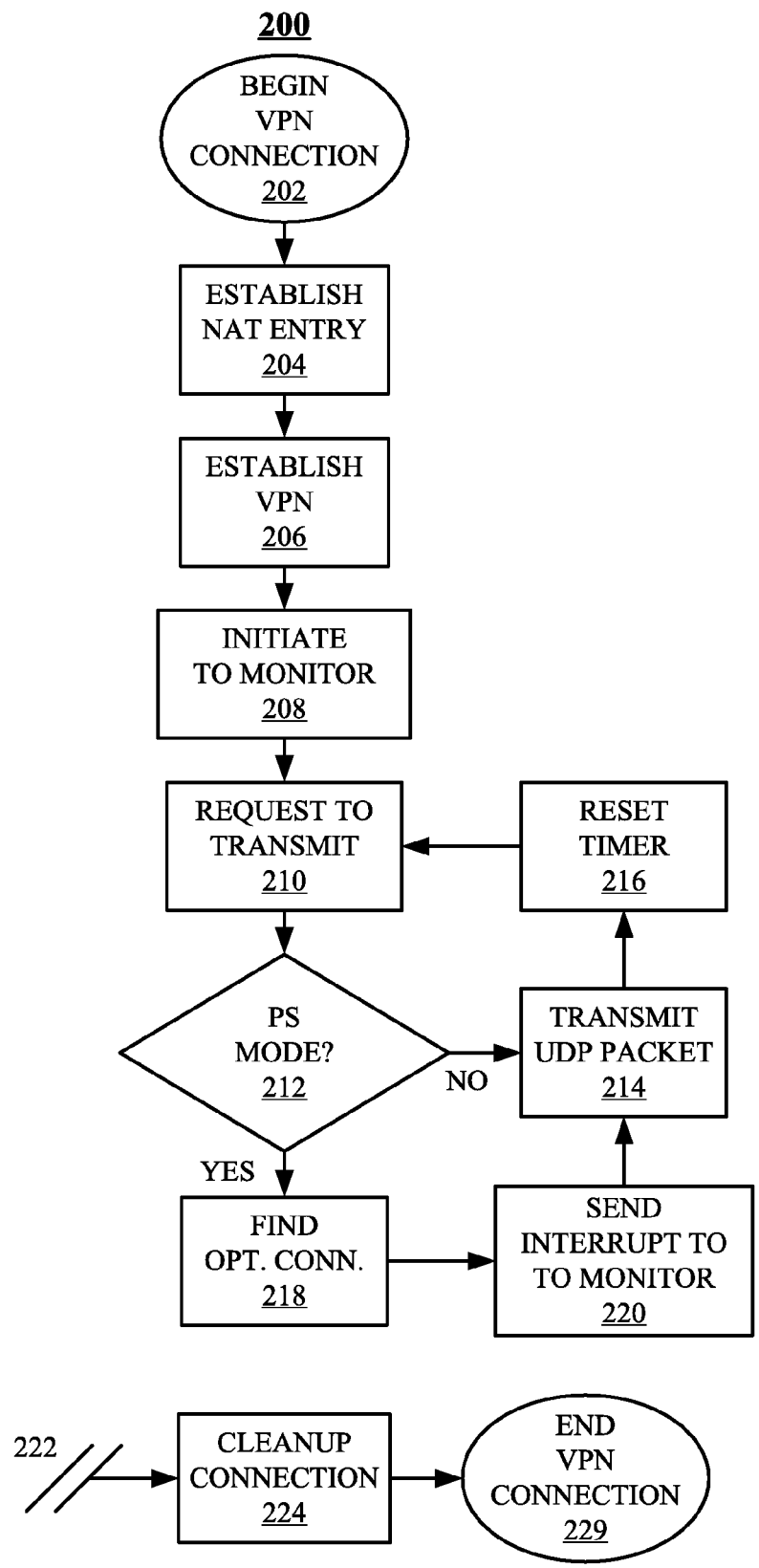
FIG. 4 is a flowchart of an Establish Virtual Private Network (VPN) process for establishing and utilizing VPN on a device that employs the claimed subject matter.

FIG. 4 is a flowchart of an Establish VPN connection process 200 for establishing and utilizing a virtual private network (VPN) on a device that employs the claimed subject matter. In the following example the device is telephone 132 (FIGS. 1 and 3), although the technique is applicable to any mobile device that communicates and in which power conservation is desirable, and telephone 132 is establishing, via VPN server 174 (FIG. 3), a VPN connection to application 176 (FIG. 3). Process 200 starts in a "Begin VPN Connection" block 202 and proceeds immediately to an "Establish NAT Entry" block 204. During block 204, process 200 communicates with NAT 124 (FIGS. 1 and 3) to correlate an external IP address corresponding to telephone 132 with an internal IP address corresponding to computing system 102 (FIGS. 1 and 3) on LAN 120 (FIGS. 1 and 3). As explained above in the Background, NAT 124 enables a group of devices or machines with local area network (LAN) access to share a single or small group of external IP addresses.

Once a NAT entry has been established during block 204, process 200 proceeds to an "Establish VPN" block 206 during which process 200 communicates with VPN server 174 to establish a VPN connection, or tunnel, between telephone 132 and application 176. During an "Initiate TO Monitor" block 208, a Time Out (TO) Monitor process 270 (see FIG. 6) is initiated on telephone 132. TO Monitor process 270 is explained in more detail below in conjunction with FIG. 6.

During a "Request to Transmit" block 210, process 200 waits for a request to transmit from telephone 132 through the VPN tunnel. A request may be generated by, for example but not limited to, a user manually initiating a telephone call carried by voice over IP (VoIP) or an automated process that updates a program such as an email folder. Once a request to transmit has been received during block 210, process 200 executes a "Power Save (PS) Mode?" block 212 during which process 200 determines whether or not telephone 132 is currently in a power conservation state. This determination is made by checking the value of the power state parameter stored in conjunction with configuration data module 154 (FIG. 2).

If process 200 determines that telephone is not currently in a power conservation state, control proceeds to a "Transmit UDP Packet" block 214. During block 214, process 200 transmits the packet received during block 210 to application 176 via the VPN tunnel established during 206 over UDP channel 114 (FIG. 1). During a Reset Timer block 216, once the packet is transmitted, power TO timer 156 (FIG. 2) of PCL 150 (FIG. 2), both associated with Timeout (TO) Monitor process 270, is reset to a value equal to the power timeout parameter. Timer 156 and process 270 are explained in detail below in conjunction with FIG. 6. Once the power timer has been reset, control returns to Request to Transmit block 210 and processing continues as described above.

If, during block 212, process 200 determines that telephone 132 is in a power conservation mode, control proceeds to a "Find Optimum Connection (Opt. Conn.)" block 218. During block 218, telephone 132 scans available communication channels for the best available channel. As explained above in conjunction with the Background, telephone 132 may be configured to determine the best channel based upon several criteria such as, but not limited to, strongest signal or most cost effective channel. As explained below in conjunction with FIG. 6, according to the claimed subject matter, roaming is resumed in block 218 because it is suspended during a power conservation state.

During a "Send Interrupt to TO Monitor" block 220, process 200 transmits an asynchronous interrupt 280 (see FIG. 6) that causes Timeout (TO) Monitor process 270 to transition to an active state or, in other words, exit a power conservation state. Process 200 then proceeds to block 214 during which, as explained above, the packet received during block 210 is transmitted. As explained above in conjunction with FIG. 3, a transmission of a packet following a power conservation state initiates the re-registration of telephone 132 with NAT 124. In other words, messages 162, 164, 166 and 168, described above in conjunction with FIG. 3, are transmitted and received by the appropriate devices to reestablish NAT 124 entry corresponding to telephone 132. Following the transmission of the packet during block 214, process 200 proceeds to Reset Timer block 216 and processing continues as described above.

In typical operation, process 200 executes continuously while telephone 132 is turned on. In the event telephone is turned off, an asynchronous interrupt 222 is generated. Regardless of the current execution state, interrupt 222 causes process 200 to proceed to a "Cleanup Connection" block 224 during which the VPN connection established during block 206 is terminated. In another embodiment, the VPN connection is not explicitly cleaned up but rather VPN server 174 eventually takes care of all connections that have been inactive for a specified period of time. Once the VPN connection is terminated and any other necessary cleanup activities are executed, process 200 proceeds to an "End VPN Connection" block 229 during which process 200 is complete.

Figure 5:
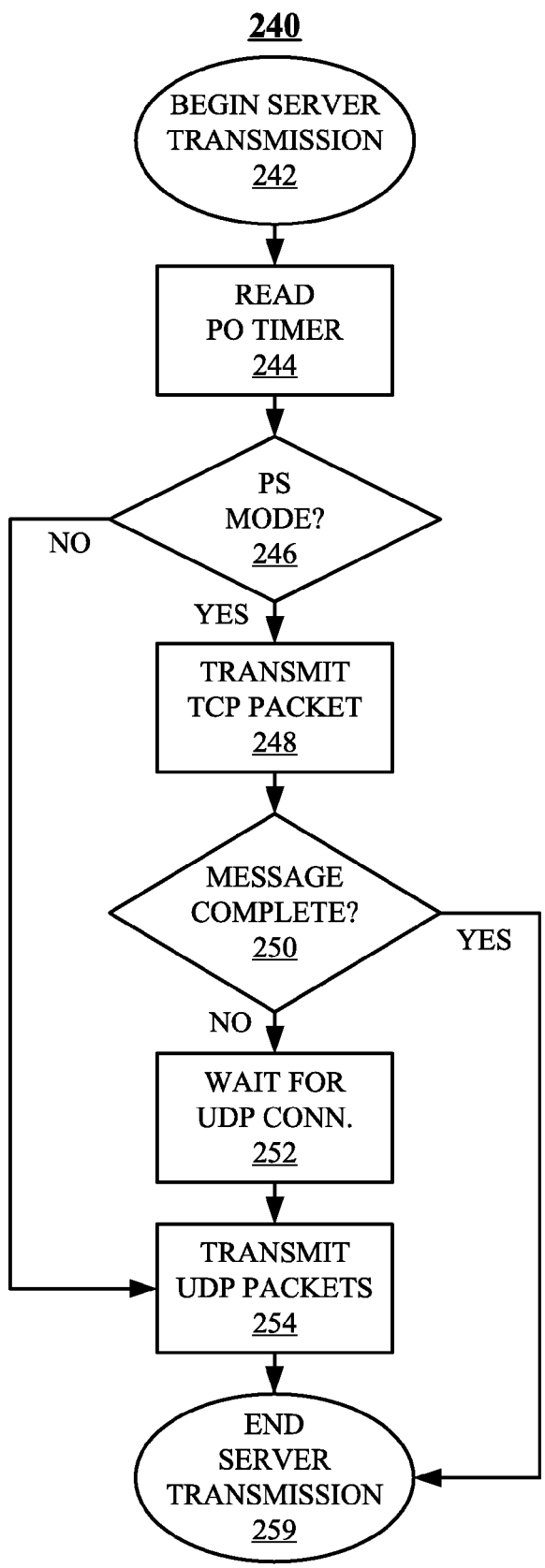
FIG. 5 is a flowchart of a Server Transmission process that describes server-initiated communication according to the claimed subject matter.

FIG. 5 is a flowchart of a Server Transmission process 240 that describes server-initiated communication according to the claimed subject matter. In the following example, process 240 is stored in data storage 112 (FIG. 1), initiated by computing system 102 (FIG. 1) and executed on CPU 104 (FIG. 1) when application 176 has a message to transmit to telephone 132 (FIG. 1) and UDP connection 114 (FIG. 1) is inactive because of lack of use.

Process 240 starts in a "Begin Server Transmission" block 242 and proceeds immediately to a "Read Power Out (PO) Timer" block 244. During block 244, process 240 compares the period of inactivity on UDP channel 114 with a power timeout parameter that corresponds to the power timeout parameter stored in PCL configuration data module 154 (FIG. 2). In other words, process 240 accesses the power timeout parameter, which has been transmitted from PCL 150 (FIG. 2) during channel setup, to employ in a determination of whether or not telephone 132 is currently in a poser saving state. During a "Power Save (PS) Mode?" block 246, process 240 determines whether or not telephone 132 is in a power saving state based upon the result generated during block 244.

If, during block 246, process 240 determines that telephone 132 is likely to be in a power saving state, process 240 proceeds to a "Transmit TCP Packet" block 248. During block 248, process 240 transmits a message, in this example message 172 (FIG. 3), to telephone 132 via TCP channel 116 (FIG. 1). As explained above, the transmitted message may be either a wakeup message transmitted to initiate the restoration of UDP channel 114, as described above in conjunction with FIG. 4, or may include some or all of an intended transmission to telephone 132.

During a "Message Complete?" block 250, process 240 determines if the TCP packet or packets transmitted during block 248 constitute the entire message from application 176 to telephone 132. This determination is made based upon a flag transmitted in conjunction with message 172. If process 240 determines that message 172 does not include the entire intended communication, control proceeds to a "Wait for UDP Connection" block 252. During block 252, process 240 waits for telephone 132 to complete the restoration of UDP connection 114, as described above in conjunction with FIGS. 2-4.

During a "Transmit UDP Packets" block 254, the remainder of the intended message is transmitted on UDP channel 114. Block 254 is also reached by process 240 if, during block 246, process 240 has determined that UDP connection 114 is still active because the period of inactivity on UDP channel 114 has not exceeded the power timeout value. Finally, control proceeds to an "End Server Transmission" block 259 during which process 240 is complete. Block 259 is reached either once the intended message has been transmitted during block 254 or process 240 has determined during block 250 that there is no need to reestablish UDP connection 114 because the entire intended message was transmitted during block 248.

Figure 6:
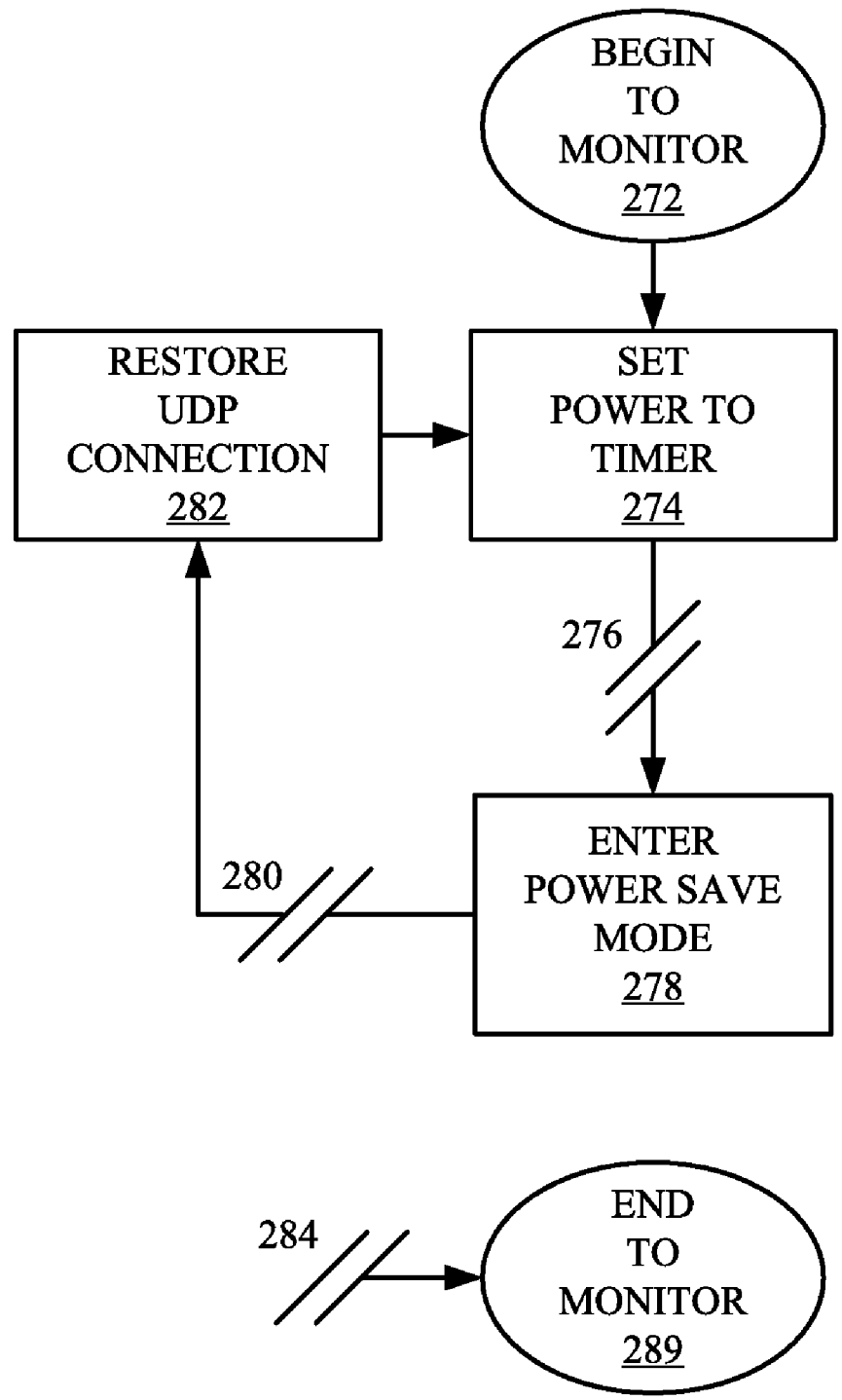
FIG. 6 is a flowchart of a Timeout (TO) Monitor Power process according to the claimed subject matter.

FIG. 6 is a flowchart of a Monitor Power process 270 executed on telephone 132 according to the claimed subject matter. Briefly, process 270 determines when a period of inactivity on telephone 132 has exceeded the power timeout parameter stored in conjunction with PCL configuration data 154 of PCL 150, described above in conjunction with FIG. 2.

Process 270 starts in a "Begin Timeout (TO) Monitor" block 272 and proceeds immediately to a "Set Power TO Timer" block 274. During block 274, a power TO timer 156 (FIG. 2) is set to the value of the power timeout parameter stored in conjunction with PCL configuration data module 154. As explained above in conjunction with FIG. 4, timer 156 is reset during Reset Timer block 216 of process 200 whenever telephone 132 transmits via the VPN tunnel.

If a period of time equal to the power timeout parameter has passed without VPN activity on telephone 132, timer 156 expires, generating an asynchronous interrupt 256. Interrupt 276 causes control of process 270 to proceed to an "Enter Power Save Mode" block 278.

During block 278, telephone suspends keep-alive messages and discontinues roaming. In this manner, telephone 132 conserves battery power during periods of inactivity. When asynchronous interrupt 280, first introduced above in conjunction with FIG. 4, is generated, process 270 transitions from block 278 to block 274 and processing continues as described above. As explained above, asynchronous interrupt 280 is generated by process 200 (FIG. 4) when telephone 132 is in the power conservation state and has a packet to transmit and the transition is associated with a return to an active state in which keep-alive messages and roaming are resumed in telephone 132.

Process 270 is designed to operate continuously while telephone 132 is powered on. If however telephone 132 is powered off or a user wishes to disable the claimed power conservation features, an asynchronous interrupt 282 causes process 270 to proceed immediately to an "End TO Monitor" block 289 in which process 270 is complete.

In another embodiment, rather than an event driven timer, the detection of a period of inactivity that exceeds the power timeout parameter may be accomplished by periodically comparing the current time to the time of the most recent activity of telephone 132 that employed the VPN tunnel. Those with skill in the computing arts should appreciate that there are many ways of detecting whether or not a particular period of inactivity exceeds the power timeout value.

While the invention has been shown and described with reference to particular embodiments thereof, it will be understood by those skilled in the art that the foregoing and other changes in form and detail may be made therein without departing from the spirit and scope of the invention, including but not limited to additional, less or modified elements and/or additional, less or modified blocks performed in the same or a different order.

We claim:

1. A method for conserving power on a mobile computing device, comprising:
   - establishing a first communication channel using a first communication protocol between a server device and the mobile computing device;
   - establishing a second communication channel using a second communication protocol between the server device and the mobile computing device, wherein the second communication protocol requires less power to maintain than the first communication protocol;
   - discontinuing channel maintenance activity on the first communication channel when a period of inactivity on the first communication channel exceeds a timeout parameter;
   - determining, at the server device, when the channel maintenance activity has been discontinued by comparing the period of inactivity on the first communication channel to the timeout parameter;
   - signaling the mobile communication device from the server device via the second communication channel when the server has determined that the channel maintenance activity has been discontinued; and
   - setting a flag in a signal, from the server device to the mobile communication device, corresponding to the signaling, the flag indicative of whether or not to resume the channel maintenance activity on the first communication channel.

2. The method of claim 1, wherein the first communication channel is a UDP connection and the second communication channel is a TCP connection.

3. The method of claim 1, the channel maintenance activity comprising transmission of keep-alive messages on the first communication channel.

4. The method of claim 1, further comprising:
   - detecting the signal on the second communication channel when the period of inactivity on the first communication channel exceeds the timeout parameter; and
   - resuming the channel maintenance activity on the first communication channel when a signal corresponding to the signaling is detected.

5. The method of claim 4, the resuming the channel maintenance activity comprising resuming transmission of keep-alive messages on the first communication channel.

6. The method of claim 1, wherein the first communication channel supports a virtual private network (VPN).

7. A system for conserving power on a mobile computing device, comprising:
   - a mobile communication device;
   - a first communication channel using a first communication protocol between a server device and the mobile computing device;
   - a second communication channel using a second communication protocol between the server device and the mobile computing device, wherein the second communication protocol requires less power to maintain than the first communication protocol;
   - logic for:
     - discontinuing maintenance activity on the first communication channel when a period of inactivity on the first communication channel exceeds a timeout parameter;
     - for determining, at the server device, when maintenance activity has been discontinued by comparing the period of inactivity on the first communication channel to the timeout parameter; and
     - signaling the mobile communication device from the server device via the second communication channel when the server has determined that maintenance activity has been discontinued; and
   - a flag in a signal, from the server device to the mobile communication device, corresponding to the signaling, the flag indicative of whether or not to resume maintenance activity on the first communication channel.

8. The system of claim 7, wherein the first communication channel is a UDP connection and the second communication channel is a TCP connection.

9. The system of claim 7, the logic for the maintenance activity comprising logic for the transmission of keep-alive messages on the first communication channel.

10. The system of claim 7, further comprising:
    - logic for detecting the signal on the second communication channel when the period of inactivity on the first communication channel exceeds the timeout parameter; and
    - logic for resuming maintenance activity on the first communication channel when a signal corresponding to the signaling is detected.

11. The system of claim 10, the logic for resuming maintenance activity comprising logic for resuming transmission of keep-alive messages on the first communication channel.

12. The system of claim 7, wherein the first communication channel supports a virtual private network (VPN).

13. A computer programming product for conserving power on a mobile computing device, comprising:
    - a memory;
    - logic, stored on the memory, for;
    - establishing a first communication channel using a first communication protocol between a server device and the mobile computing device;
    - establishing a second communication channel using a second communication protocol between the server device and the mobile computing device, wherein the second communication protocol requires less power to maintain than the first communication protocol;
    - discontinuing maintenance activity on the first communication channel when a period of inactivity on the first communication channel exceeds a timeout parameter;
    - determining, at the server device, when maintenance activity has been discontinued by comparing the period of inactivity on the first communication channel to the timeout parameter;
    - signaling the mobile communication device from the server device via the second communication channel when the server has determined that maintenance activity has been discontinued; and setting a flag in a signal, from the server device to the mobile Communication device, corresponding to the signaling, the flag indicative of whether or not to resume maintenance activity on the first communication channel.

14. The computer programming product of claim 13, wherein the first communication channel is a UDP connection and the second communication channel is a TCP connection.

15. The computer programming product of claim 13, further comprising:
   detecting the signal on the second communication channel when the period of inactivity on the first communication channel exceeds the timeout parameter; and
   resuming maintenance activity on the first communication channel when a signal corresponding to the signaling is detected.

16. The computer programming product of claim 15, the logic for resuming maintenance activity comprising logic for resuming transmission of keep-alive messages on the first communication channel.

17. The computer programming product of claim 13, wherein the first communication channel supports a virtual private network (VPN).

* * * * *